Figure 1:
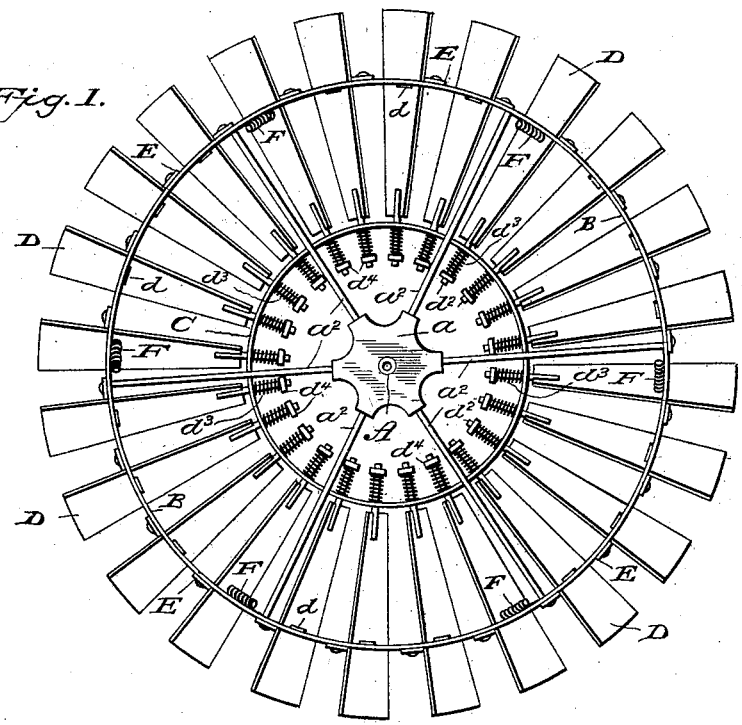

(No Model.) 2 Sheets—Sheet 1.

N. HEIN.
WINDMILL.

No. 603,188. Patented Apr. 26, 1898.

WITNESSES:
G. S. Elliott.

INVENTOR:
Nicholas Hein,
his attorney.

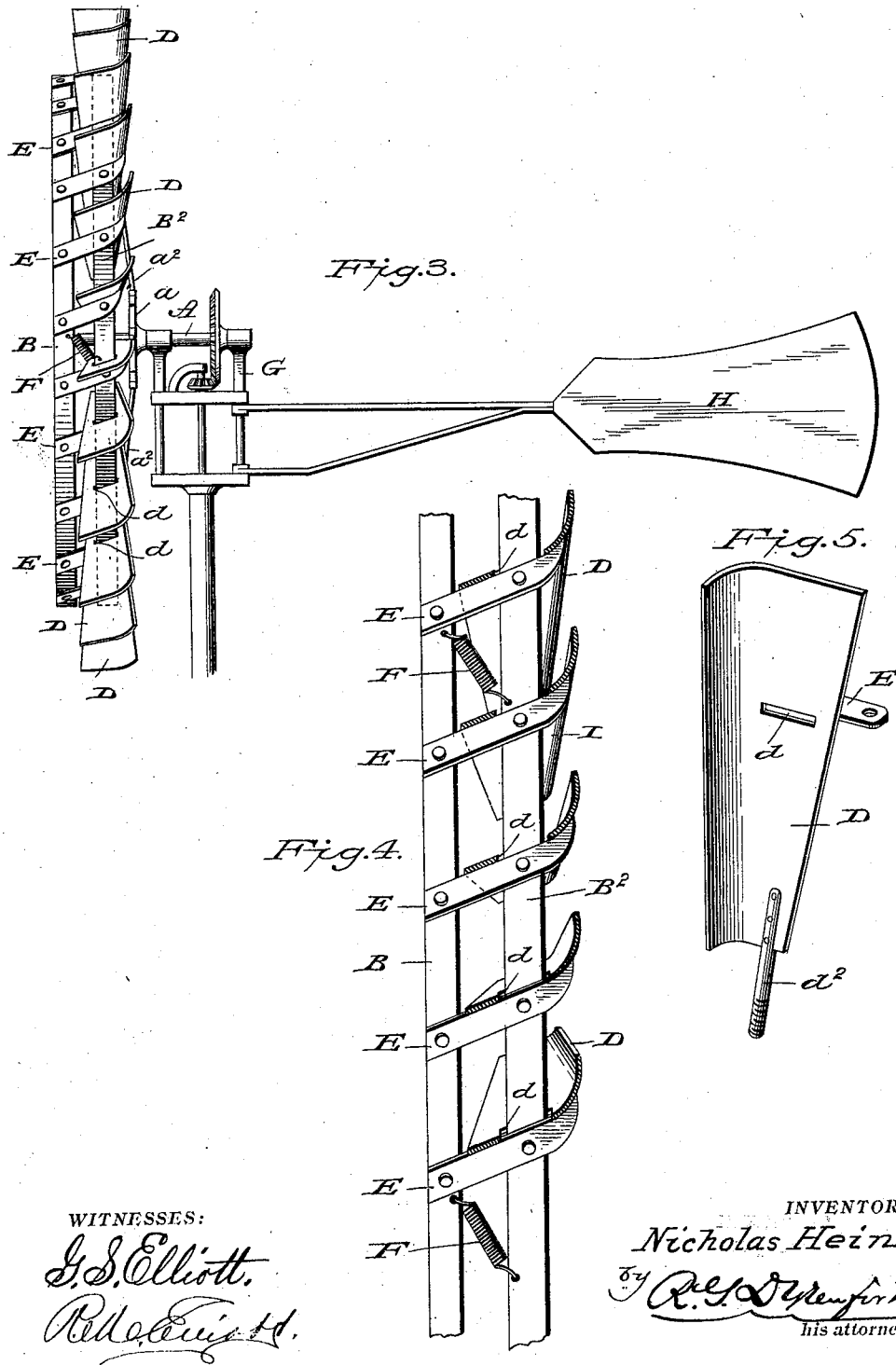

UNITED STATES PATENT OFFICE.

NICHOLAS HEIN, OF CHILTON, WISCONSIN.

WINDMILL.

SPECIFICATION forming part of Letters Patent No. 603,188, dated April 26, 1898.

Application filed August 2, 1897. Serial No. 646,800. (No model.)

*To all whom it may concern:*

Be it known that I, NICHOLAS HEIN, a citizen of the United States, residing at Chilton, in the county of Calumet and State of Wisconsin, have invented certain new and useful Improvements in Windmills; and I do hereby declare the following to be a full, clear, and exact description of the invention, such as will enable others skilled in the art to which it appertains to make and use the same.

This invention relates to windmills.

The object is to produce a windmill in which the blades will be so arranged that when the wind is light they will remain close together, and thereby present, practically, an unbroken surface to the wind; but should the wind freshen or blow hard the connections between the blades and their supports will permit the blades to yield or spread apart, so that the wind can escape between the same and thereby govern the speed of the wheel; furthermore, to provide a windmill which will be certain and effective in operation, not liable to get out of repair from use, and which may be constructed at a nominal figure.

In a windmill characterized by my invention I employ blades or slats, as usual, these being supported in such manner as to permit of turning at any desired angle with relation to the axis of the wheel, whereby to present the requisite surface to drive the wheel, but at the same time to govern its speed, as will presently appear. The blades are, viewed from above, straight at their outer edges and curved toward the rear, so as to present suitable surface for contact with the wind, and their inner portions or ends are held in position by means of bolts, one end of each of which is secured to a blade, and its other end is projected through a blade spacing or supporting hoop, with a nut secured on the said inner end of each of the said bolts. Between the nut and the inner surface of the supporting-hoop is arranged a spring, which may be placed under requisite tension by the nut, the object of these springs being to hold the blades in proper operative position with relation to the supporting-hoop, but at the same time to permit of their turning when the pressure of the wind increases to a degree that is objectionable. This supporting-hoop is held in place by means of braces secured to flanges or plates carried by the hub of the axle, the said braces serving also to hold in position for operative work a hoop for supporting the outer portions of the blades, each blade being provided with a transverse slot, through which the hoop passes. Arranged in parallel alinement with the stationary hoop is a rotatable hoop, and this latter hoop is connected with the stationary hoop by means of a plurality of links, to which the outer portions of the blades are secured, these links also being pivoted to the stationary hoop. At intervals around the diameter of the wheel and connecting the rear stationary hoop and the front rotatable hoop are springs, which serve, normally, to hold the blades at the proper inclination or angle with relation to the hub to do effective work with a light or moderately light breeze; but should the wind freshen these springs will yield and allow the front rotatable hoop to turn and thereby open the blades, so that less surface is presented to the wind, and the wheel's speed will in consequence slacken. This peculiar construction or arrangement of the blades constitutes a governor for regulating the speed of the wheel, it being necessary only to increase or diminish the tension of the springs connecting the stationary and rotatable hoops to cause the wheel to rotate more rapidly or more slowly. In other words, if these springs are light a slight change in the force of the wind will cause a decrease in the speed of the wheel, and if these springs are heavy it will require a stronger wind to operate the blades to cause the speed of the wheel to slacken.

The hub of the wheel will be supported in a suitable casting and will be provided with suitable mechanism for imparting motion to a pitman connecting with a pump or other piece of machinery, and there will also be provided a suitable vane, by which the wheel may be kept to the wind, as in windmills of ordinary construction.

In the accompanying drawings, forming a part of this specification, and in which like letters of reference indicate corresponding parts, I have illustrated a form of embodiment of my invention, although it is to be understood that other forms of embodiment thereof may be employed without departing from the spirit of the same, and in these drawings—

Figure 2:
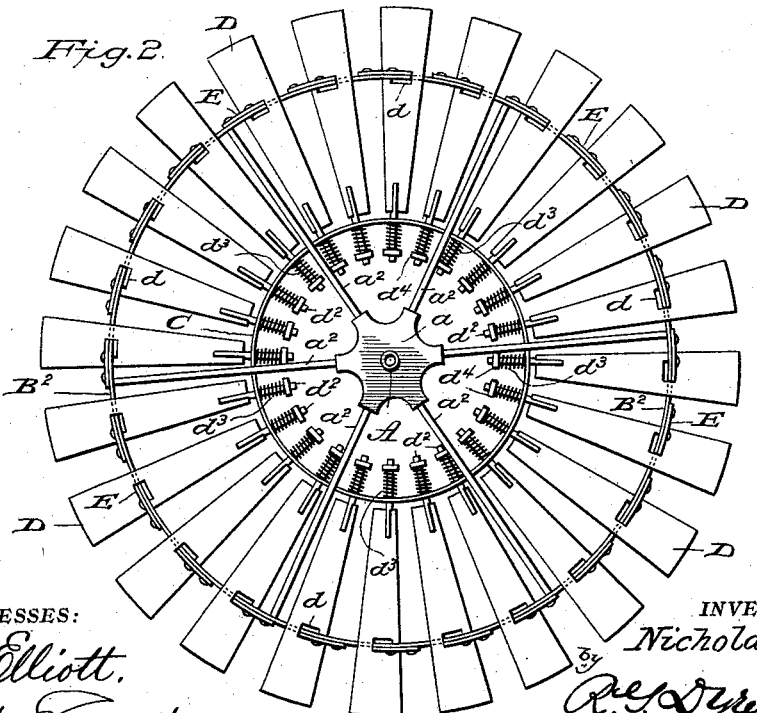

Figure 1 is a view of the wheel by itself in front elevation. Fig. 2 is a view in rear elevation of the same. Fig. 3 is a view in side elevation showing the wheel mounted upon its support. Fig. 4 is a detail view, on an enlarged scale, of a portion of the periphery of the wheel, showing more clearly the disposition of the front rotatable hoop, the rear stationary hoop, the manner of supporting the blades on these hoops, and the spring connecting the two hoops; and Fig. 5 is a detail view in perspective of one of the blades detached from the wheel, showing its peculiar construction.

Referring to the drawings, A designates the hub of the wheel, which in this instance is of the ordinary tubular style and carries two flanges $a$.

The frame of the wheel comprises, essentially, two hoops B and $B^2$ of the same size and arranged in parallel alinement with each other, the hoop B being termed from its function the "front rotatable hoop" and the hoop $B^2$ the "rear stationary hoop," a blade spacing and supporting hoop C, arranged concentrically of the hoops B and $B^2$, and the blades or laths D. The stationary hoop B and spacing-hoop C are held rigidly fixed with relation to the hub by means of braces $a^2$, secured in any suitable manner to the flanges $a$ of the hub and to the respective hoops. This arrangement will bring the stationary hoop $B^2$ and spacing-hoop C into alinement with each other. The front hoop B is held in operative position to and connected with the stationary hoop by means of links E, there being one of these links for each of the blades D and to which the blade is secured. These links are pivotally connected with the two hoops B and $B^2$ and are curved on one edge to conform to the shape of the blade.

The blades D may be constructed of any suitable material, and viewed from the broad end are straight from the front of the wheel to a point back of the rear edge of the stationary hoop, and from that point curved inward, so as to present the proper surface against which the wind may contact. The blades are each provided with a transverse slot $d$, through which the stationary hoop extends, and are held in operative position with relation to the blade-spacing hoop by means of bolts or extensions $d^2$, secured near the front edge of each blade and passing through openings in the spacing-hoop provided for the purpose. Upon each of the inner ends of these bolts is placed a coiled spring $d^3$, and on the free end of each of these bolts is turned a nut $d^4$, which is designed to place the spring under requisite tension by being turned against the same to hold the inner ends of the blades fixed with relation to the hoop C; but this tension will not be sufficient to interfere with the turning of the blades, as will presently appear. In order to hold the blades normally in proper position to allow the wheel to be driven by a light wind, the stationary hoop and rotatable hoop are connected by a series of coiled springs F, in this instance six in number, the tension of these springs being normally such as to allow the wheel to respond to a light or ordinary breeze; but should a strong wind start up the pressure of the same against the blades will cause the blades to rock on their bolts, and thus turn the front hoop and with it all of the blades to such position as to present but small surface to the wind. This will of course result in lessening the speed of the wheel, and therefore this arrangement of the rotatable hoop and pivoted blades constitutes a governor.

The hub of the wheel is supported upon a suitable casting G, carrying suitable mechanism for imparting motion to a pitman-rod connecting with a pump or other piece of machinery and may either be a crank or a bevel-gear, as shown. A suitable vane II is also provided for keeping the wheel to the wind, as usual. As these latter parts do not form any part of the present invention a detailed description of them is deemed unnecessary.

Having thus described my invention, what I claim as new, and desire to secure by Letters Patent of the United States, is—

A windmill comprising a hub, a spacing-hoop, and an outer stationary hoop rigid with relation to the hub, a rotatable hoop arranged in horizontal alinement with the outer hoop, blades loosely supported from the spacing-hoop and having slots through which the stationary hoop passes, links secured to the two outer hoops and to the blades, springs connecting the said hoops, bolts carried by the inner ends of the blades and passing through openings in the spacing-hoop, springs on the bolts, and nuts for placing the springs under tension, substantially as described.

In testimony whereof I affix signature in presence of two witnesses.

NICHOLAS $\underset{\text{mark}}{\overset{\text{his}}{\times}}$ HEIN.

Witnesses:
JOHN BERGER,
THOS. GALLOGLY.